United States Patent [19]
Conrad et al.

[11] Patent Number: 4,778,994
[45] Date of Patent: Oct. 18, 1988

[54] APPARATUS FOR THE CONVERSION OF RADIATION IMAGE INFORMATION CARRIED ON A STORAGE LAYER INTO AN ELECTRICAL SIGNAL SEQUENCE

[75] Inventors: Bernhard Conrad; Gottfried Lange, both of Erlangen; Günther Tressl, Bubenreuth, all of Fed. Rep. of Germany

[73] Assignee: Siemens Aktiengesellschaft, Berlin and Munich, Fed. Rep. of Germany

[21] Appl. No.: 915,709

[22] Filed: Oct. 6, 1986

[30] Foreign Application Priority Data

Dec. 5, 1985 [DE] Fed. Rep. of Germany ....... 3543089

[51] Int. Cl.$^4$ ...................... G03B 42/08; G01N 23/04
[52] U.S. Cl. ................................... 250/327.2; 358/302
[58] Field of Search .................... 250/327.2, 484.1; 358/302

[56] References Cited
U.S. PATENT DOCUMENTS

| 3,317,738 | 5/1967 | Piepenbrink et al. | |
|---|---|---|---|
| 3,758,197 | 9/1973 | Klang et al. | 350/286 |
| 4,065,672 | 12/1977 | Harpster | 250/372 |
| 4,096,387 | 6/1978 | Buckley | 250/372 |
| 4,320,296 | 3/1982 | Ishida et al. | 250/327.2 |
| 4,527,060 | 7/1985 | Suzuki et al. | 250/327.2 |
| 4,591,714 | 5/1986 | Goto et al. | 250/327.2 |
| 4,616,129 | 10/1986 | Yamada et al. | 250/227 |
| 4,629,890 | 12/1986 | Goto et al. | 250/327.2 |
| 4,691,232 | 9/1987 | Lange | 250/327.2 |

FOREIGN PATENT DOCUMENTS

| 0083085 | 9/1983 | European Pat. Off. | |
|---|---|---|---|
| 0131244 | 1/1985 | European Pat. Off. | |
| 142865 | 5/1985 | European Pat. Off. | 250/327.2 |

OTHER PUBLICATIONS

"Rompps Chemie-Lexikon", Dr. Otto-Albrecht Neumuller, p. 1959 (1973).

Primary Examiner—Carolyn E. Fields
Attorney, Agent, or Firm—Hill, Van Santen, Steadman & Simpson

[57] ABSTRACT

An apparatus for converting image information generated by radiation incident on a storage layer into an electrical signal sequence by scanning the storage layer with a light beam permits a fast and precise conversion of the radiation image information into the electrical signal. This is a accomplished by connecting the scanned point of the storage layer to photodiodes functioning as light transducers via a light conductor in the form of a transparent, strip-shaped plate. The light conductor plate has a major surface adjacent to the storage area, and respective minor surfaces at opposite narrow ends thereof to which the photo diodes are connected. The apparatus can be used in x-ray television technology, such as medical x-ray diagnostics.

13 Claims, 1 Drawing Sheet

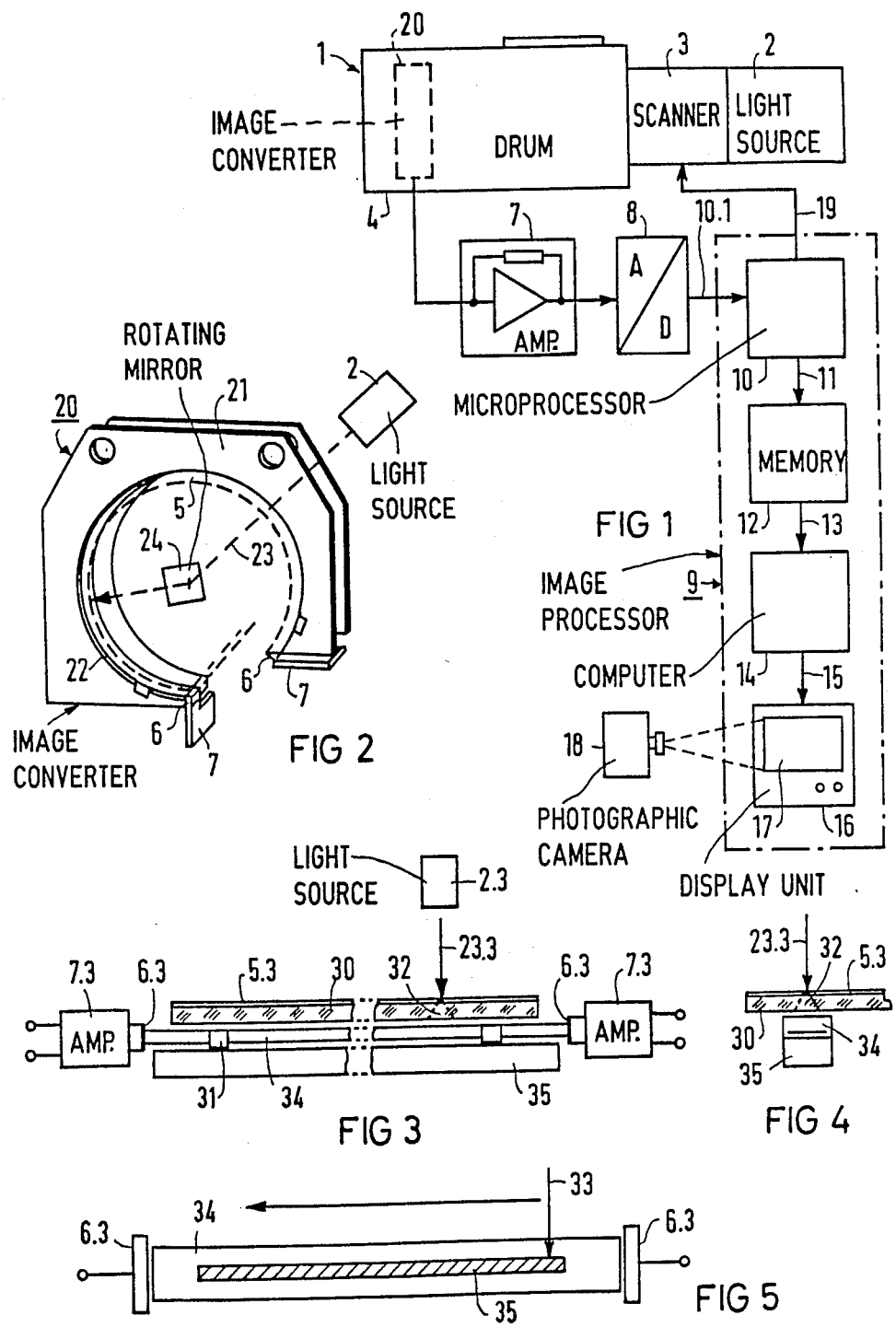

APPARATUS FOR THE CONVERSION OF RADIATION IMAGE INFORMATION CARRIED ON A STORAGE LAYER INTO AN ELECTRICAL SIGNAL SEQUENCE

BACKGROUND OF THE INVENTION

1. Field of the Invention

The present invention relates to devices for converting radiation image information carried in a storage layer into an electrical signal sequence.

2. Description of the Prior Art

An apparatus for converting radiation image information which is formed by radiation incident on a storage (or persistent) layer into an electrical signal sequence is generally described, for example, in U.S. Pat. No. 3,859,527. In these types of devices films such as other x-ray exposures or transparent originals are read by a laser beam. The light passing through the original is collected using fiber optics and is supplied to a photomultiplier for conversion into electrical signals, this process sometimes being called cross-sectional conversion. Such devices can also be used for illuminating images recorded in a stimulable phosphor, particularly x-ray pictures. This illumination can also be undertaken by scanning with light, such as a laser beam. The illumination light, as in the transillumination of film images, can be supplied via fiber optics to a photomultiplier and converted into electrical signals.

In conventional photomultipliers, the amplification factor changes in accordance with the changing incident light intensities, which may vary greatly due to the differing transparency of different film images, or differing intensity of stimulable images. A constancy of only one to two percent can thus be achieved with photomultipliers during the scanning of an original. This does not permit contrast enhancements (which may be done using the so-called window technique) to be made, which are desired, for example, in scanning x-ray images so that extremely small differences in optical density can be made visible. For this purpose, the amplification factor must be maintained constant within about 0.1% so that stripe artifacts are avoided. This cannot be achieved with photomultipliers, or can only be achieved with great difficulty, because under the influence of the dynode current, the secondary emission coefficient of the dynodes, and thus the amplification factor, changes. This occurs to an even greater extent as the current increases. If the current is maintained low (low MP high-voltage), for example, under 0.01 $\mu$A, the smallest current is only 0.1 $\mu$A due to the high dynamic ratio of 1:1000, thus requiring a significant circuit outlay for post-amplification.

In theory, replacing the photomultipliers with photo diodes would avoid fluctuations in the amplification factor, however, due to the large area required for image scanning, a high inverse current would result, leading to a less favorable signal-to-noise ratio. Extremely low intensity signals could not be recorded with such a transducer. In x-ray pictures, however, an evaluation of optical intensities of approximately S=3 is meaningful, which would be lost using a diode array. Moreover, the manufacture of photo diodes having the areas required in conventional converters is difficult because large area sensitivities which are uniform over the entire area are troublesome to manufacture.

SUMMARY OF THE INVENTION

It is an object of the present invention to provide a detector system for reading stored x-ray images with a high precision over a large range of optical density.

The above object is achieved in accordance with the principles of the present invention by the use of a light conductor strip or plate having a major face disposed adjacent the scanned surface, and having a minor face from which the incoming light exits.

The light conducting strip, used in place of the fiber optics, may also function as a light converter (wave length shifter). The strip which conducts the incident light to the transducer includes a substance for converting the light into light of a different wave length. For example, if an argon laser is used as the light source, having a wave length of 488 nm (blue), the light conductor strip may convert the light at its exit port to light having a wave length of 570 nm (yellow). By highly polishing the surfaces, the properties of the strip as a light conductor can be further enhanced. The transition of the light to the light conductor can also be improved by coupling the light conductor to the photo detector by an immersion fluid or with optical glue. A light conductor constructed in accordance with the principles of the present invention 440 mm in length having a cross-section of 3 mm×10 mm has a conversion efficiency of at least 10%, i.e., at least 10% of the light intensity incident on the strip was made useable in photo diodes at the narrow light exit ends, that is, was converted into electrical signals.

If a photo diode is disposed at each narrow exit end of the light conductor, the total area of the two photo diodes constitutes only about 2% of the total area of the light-conducting strip. The ratio of the signal current to the inverse current is thus higher by at least a factor of 10, by virtue of the smaller surfaces, than if the light were to be transmitted onto a large photo diode through fiber optics (a light transmission efficiency of 50% being assumed for the fiber optics).

The scanning apparatus can be constructed in a known manner for use with the subject matter of the invention. The scanner may, for example, be a drum scanner, with the storage surface disposed on the inside of the drum, or a flat scanner. The subject matter of the invention can be used with scanning light which is transmitted to the storage plate, or with light which is directly incident thereon from a source. In general, the subject matter of the invention can be used in any context wherein an original image is to be converted into a sequence of light signals corresponding to the density distribution of optical contrasts on the original. The light signals are then conducted via light conductors to photo diodes, and are converted into the desired sequence of electrical signals.

The light conductors employed for transporting the light signals may consist of transparent plastic. A plastic body consisting of, for example, acrylic glass is suitable, which is sufficient for a wave length of 488 nm. Other types of transparent plastic dyed with fluorescing dye-stuff molecules are also suitable. The manufacturer of the light conductor employed in a scanning device may begin with a transparent plastic plate, from which a piece corresponding to the desired shape of the light conductor is cut, and which is given a smooth surface by polishing for promoting light conduction.

Fluorescent substances of the group 2, 5-dioxy terephtalicacid di-ethyl ester (blue) or dioxy naphthal dazine (yellow-green) can be employed as wave length shifters. Substances which respond well to the light to be converted are particularly favorable and which emit fluorescent light which is particularly effective for the type of photo diodes which are used. The substances should also be soluble in the material of the light conductor so that they can be uniformly distributed therein in a simple manner.

All types of photo diodes can be used with the subject matter of the application which respond to light resulting from scanning of the image information. For example, if an argon (488 nm) laser having a 6 mW output is used, a photo diode which emits a current of 1 $\mu$A when the laser beam is shown directly thereon is suitable. In a converter constructed in accordance with the principles of the present invention, this will result in a sum current of all of the diodes of 100 $\mu$A without film absorption, which drops to 50 $\mu$A given film absorption with a film fog, and to 50 nA with an S=3 absorption.

The inverse current (sum) of diodes having a total area of 0.8 cm$^2$ is approximately 80 nA given good boundary layer structure, so that the aforementioned signal can still be easily distinguished from the inverse current. (The inverse current can be subtracted from the total signal; its noise is smaller that many orders of magnitude than the size ot the current itself. As a result of the large temperature dependency of the inverse current, however, regular calibration measurements are required which, if necessary, can be undertaken automatically in intervals between two scanning sequences.) An inverse voltage of about 10 through 30V is assumed in order to achieve a sufficiently fast decay of the signal current. Given photo diodes with an inverse voltage for the extraction of charge carriers, a rise time of 30 ns can be achieved. This is far below the measuring time of 1 through 2 $\mu$s per pixel, which is currently required for digitization of x-ray pictures using, for example, a 12 or 14 bit analog-to-digital converter. An order for a contrast of 1:1000 to be recorded, and in order for the lowest stage to still be resolved into a few steps, 12 stages (4096 bits) are required.

Inverse currents, lower by about one order of magnitude, can be achieved with implanted photo diodes, i.e., a photo diode in which an opposite doping is implanted in the semiconductor material, for example, boron in silicon for generating a p-semiconductor. Such diodes are commercials available.

DESCRIPTION OF THE DRAWINGS

FIG. 1 is a schematic block diagram of an apparatus for converting radiation image information carried in a storage layer into an electrical signal sequence embodying the principles of the present invention.

FIG. 2 shows a front view of a converter employed in the apparatus of FIG. 1 in a drum embodiment constructed in accordance with the principles of the present invention.

FIG. 3 is a side elevational view of a flat converter constructed in accordance with the principles of the present invention.

FIG. 4 is an end elevational view of the converter shown in FIG. 3.

FIG. 5 is a plan view of the converter shown in FIG. 3.

DESCRIPTION OF THE PREFERRED EMBODIMENTS

An apparatus for converting radiation image information into an electrical signal sequence is generally referenced at 1 in FIG. 1. The apparatus includes a light source 2 for directing a light beam via a scanner 3 onto a film 5 (see following figures) serving as a storage plate, such as an x-ray film exposure or a stimulable phosphor exposure. The film 5 is secured in a drum 5 and has a distribution of locations of different degrees of transparency viewable in transmitted light. The light triggered by or transmitted through the film 5 proceeds onto photo diodes 6. The output signals of the photodiodes 6 are supplied to amplifiers 7 and are then transmitted through an analog-to-digital converter 8 to an image processor 9 via line 10.1. The image processor 9 includes a microprocessor 10 connected via a line 11 to a memory 12, which is connected via a line 13 to a computer 14. The output signals from the computer 13 are supplied via a line 15 to a display unit 16, such as a video monitor, and a visible image is generated on the screen 17 of the display unit 16. The image on the screen 17 may, for example, be fixed with a photographic camera 18.

The microprocessor 10 is also connected to the scanner 3 via a line 19 for synchronizing scanning of the storage layer of the film 5.

The signals supplied to the amplifier 7 are, of course, already in electrical form, having been converted to that form in a converter 20. As shown in greater detail in FIG. 2, the converter 20 includes a support 21 having a generally circular opening with a gap therein. The opening in the support 21 has a radius of about 110 mm, and can be conducted over the film 5 held in the drum 4. A light conducting strip 22 which contains a fluorescent material functioning as a wave length shifter dissolved therein is disposed in the interior of the opening. The light conducting strip 22 may consist, for example, of acrylic glass and have dimensions of 30 mm in width and 3 mm in thickness. The thickness of 3 mm forms a factor of 110:3 with the radius of 110 mm. This exceeds the factor of twenty, which is a factor necessary as a rule-of-thumb for the curvature of optical fibers in order to avoid light losses. If the curvature is too large, the angle of incidence on the outside of the light conductor becomes too small and total reflection does not occur.

The scan beam 23 from the source 2 which may, for example, be a 6 mW argon laser, emitting light at a wave-length of 488 nm (blue), is deflected by a rotating mirror 24 and can penetrate the film 25. Depending on the transparency of the image stored in the film 5, different light quantities proceed to the light conductor 22. The light is absorbed therein by the wave length shifter, which emits light of another wave-length of 570 nm (yellow) which is conducted to the photodiodes 6 in which signals corresponding to the distribution of the transparency in the original are generated. These signals can proceed via the amplifiers 7 to the image processor 9, and made visible as described above.

The fluorescing material may be a luminophore consisting of europium (Eu) activated with a barium (Ba) multiple halogenide (FClBr), for example BaFClBr:Eu or lanthanum (La) oxibromide (OBr) activated with terbium (Tb), such as LaOBr:Tb.

An apparatus in a flat embodiment for converting stored image signals in accordance with the principles of the present invention is shown in different views in FIGS. 3 through 5. In this embodiment, a planar storage layer 5.3 is seated on a transphosphorescent storage screen and may have a size of 40 cm×40 cm. The photoconductor arrangement is disposed a distance of 7 mm below the plate 30 in a mount 31, which can be moved in accordance with the line-by-line displacement of the scanning movement of the light beam 23.3. The scanning light beam 23.3, from the light source 2.3, triggers phosphorescent light in the film 5.3 which, as indicated by 32 in FIGS. 3 and 4, penetrates the glass plate 30. As indicated in FIG. 5 at 33, the triggered light then reaches the actual light path or entry in the light conductor 34 which may be, for example, 3 mm thick and 10 mm wide. The light is conducted via the light conductor 34 to photodiodes 6.3 optically coupled to each of the end faces of the light conductor 34 by an immersion fluid, such as oil or optical glue. The entire arrangement is mounted on a base or table 35.

Although modifications and changes may be suggested by those skilled in the art it is the intention of the inventors to embody within the patent warranted hereon all changes and modifications as reasonably and properly come within the scope of their contribution to the art.

We claim as our invention:

1. In an apparatus for converting image information in a storage layer into an electrical signal having means for scanning a surface of said storage layer with a light beam, means for relatively displacing said light beam and said storage layer during scanning, and a photo electric transducer for generating said electric signal, the improvement comprising:

a light conductor for transmitting light from said storage layer to said transducer, said light conductor disposed following said storage layer in the direction of propagation of said light beam, and said light conductor being a strip with a rectangular cross-section and having a major face disposed against said storage layer and at least one end face optically coupled to said transducer, wherein said end face is a minor face.

2. The improvement of claim 1, wherein said light conductor has two opposite end faces, and wherein said apparatus has two photo electric transducers respectively optically coupled to each of said end faces.

3. The improvement of claim 1, wherein said transducer is a photo diode.

4. The improvement of claim 1, wherein said light conductor contains a fluorescing substance which shifts the wave length of light incoming to said light conductor from said storage layer.

5. The improvement of claim 4, wherein said means for scanning a surface of said storage layer with a light beam includes an argon laser emitting light at a wave length of 488 nm, and wherein said fluorescing substance converts said light from said laser into light of wave length 570 nm.

6. The improvement of claim 4, wherein said light beam is a blue light beam, and wherein said fluorescing substance shifts the wave length of said blue light beam to yellow.

7. The improvement of claim 4, wherein said fluorescing substance is selected from the group consisting of dioxy naphthal dazine luminophores.

8. The improvement of claim 4, wherein said fluorescing substance is europium activated with a barium multiple halogenide.

9. The improvement of claim 4, wherein said fluorescing substance is lanthanum oxibromide activated with terbium.

10. The improvement of claim 1, wherein said light conductor consists of acrylic glass.

11. The improvement of claim 1, wherein said transducer is optically coupled to said end face of said light conductor by an immersion fluid.

12. The improvement of claim 11, wherein said immersion fluid is oil.

13. The improvement of claim 11, wherein said immersion fluid is optical glue.

* * * * *